US010382088B2

(12) United States Patent
Pelleschi

(10) Patent No.: US 10,382,088 B2
(45) Date of Patent: Aug. 13, 2019

(54) METHOD OF MANAGING FREQUENCIES, AND A COMMUNICATIONS DEVICE IN AN AIRBORNE PLATFORM

(71) Applicant: Rockwell Collins France, Blagnac (FR)

(72) Inventor: Stephane Pelleschi, Bannieres (FR)

(73) Assignee: ROCKWELL COLLINS FRANCE, Blagnac (FR)

( * ) Notice: Subject to any disclaimer, the term of this patent is extended or adjusted under 35 U.S.C. 154(b) by 321 days.

(21) Appl. No.: 14/659,346

(22) Filed: Mar. 16, 2015

(65) Prior Publication Data

US 2015/0263781 A1    Sep. 17, 2015

(30) Foreign Application Priority Data

Mar. 17, 2014 (FR) .................................. 14 52192

(51) Int. Cl.
*H04B 1/54*     (2006.01)
*H04B 7/26*     (2006.01)
*G08G 5/00*     (2006.01)
*H04B 7/185*    (2006.01)

(52) U.S. Cl.
CPC ............. *H04B 1/54* (2013.01); *G08G 5/0013* (2013.01); *H04B 7/18506* (2013.01); *H04B 7/26* (2013.01)

(58) Field of Classification Search
CPC combination set(s) only.
See application file for complete search history.

(56) References Cited

U.S. PATENT DOCUMENTS

| 2011/0028147 A1* | 2/2011 | Calderhead, Jr. .. H04B 7/18506 455/431 |
| 2011/0292907 A1* | 12/2011 | Tieftrunk ........... H04B 7/18506 370/331 |
| 2012/0021740 A1* | 1/2012 | Vaidyanathan ...... G08G 5/0013 455/431 |

FOREIGN PATENT DOCUMENTS

| EP | 2 391 033 A2 | 11/2011 |
| FR | 2 922 397 | 4/2009 |
| WO | WO-02/30007 A1 | 4/2002 |
| WO | WO-2011/091191 A1 | 7/2011 |

OTHER PUBLICATIONS

ICAO Doc 9776, Edition 2, Montreal, Canada Jan. 23-25, 2013.*
European Search Report for Application No. FR 1452192, dated Nov. 24, 2014, 2 pages.

* cited by examiner

*Primary Examiner* — Zhitong Chen
(74) *Attorney, Agent, or Firm* — Foley & Lardner LLP

(57) ABSTRACT

This communications device (CMU) on board an airborne platform (PAE) is compatible with the frequency management mechanism defined by the VDL mode 2 standard. It comprises:
  activation module for activating a receiver module (VDR2) to scan an alternative frequency (FQ2) taken from a pair contained in a list (LST) of pairs received by a bidirectional module (VDR3) in communication with a ground station on another frequency;
  detector module for detecting at least one criterion representative of a break in communication with said ground station; and
  configuration module for configuring a bidirectional module (VDR3) for communicating on the alternative fre-
(Continued)

quency (FQ2) with a target ground station (VGS2) heard by the receiver module.

20 Claims, 7 Drawing Sheets

| FQ2 | | | |
|---|---|---|---|
| VGS ID | SQP | SVC | COV |
| VGS2 | 4 | AOA, ATN | LFBO |
| VGS3 | 6 | AOA, ATN | LFDG |

| FQ3 | | | |
|---|---|---|---|
| VGS ID | SQP | SVC | COV |
| VGS4 | 3 | ATN | - |

| FQ2 | VGS3 |
|---|---|
| FQ3 | VGS4 |
| FQi | VGSi |

METHOD OF MANAGING FREQUENCIES, AND A COMMUNICATIONS DEVICE IN AN AIRBORNE PLATFORM

CROSS-REFERENCE TO RELATED PATENT APPLICATIONS

The present application claims the benefit of and priority to French Provisional Patent Application Serial No. 1452192, filed on Mar. 17, 2014, which is hereby incorporated by reference in its entirety and for all purposes.

BACKGROUND OF THE INVENTION

The invention relates to the field of methods of communicating data between an airborne platform and ground stations, particularly but not exclusively for air traffic control.

The context of the invention is described with reference to FIG. 1, which shows one of the problems in the present state of the art.

In this figure, there can be seen a communications device CMU0 of the type to be found on board airborne platforms and suitable for communicating at a given instant with a ground station VGS1, VGS2, or VGS3 via a bidirectional communications module VDR configured to operate on the frequency of that station, using the very high frequency (VHF) data link (VDL) mode 2 protocol.

It should be recalled that the VDL mode 2 data communication protocol may be used in particular for air traffic control (ATC). The invention is situated in particular in the general field known as controller-pilot data link communications (CPDLC).

In known manner, the communications device CMU0 sends downlink messages referenced F1, F3 to the ground station VGS1, and it receives from this station uplink messages referenced F2, F4 in compliance with this protocol, e.g. for air traffic control.

In known manner, in accordance with this protocol, the ground stations VGS1, VGS2, VGS3 are suitable for broadcasting a message GSIF regularly, about once every 90 seconds, which message GSIF comprises at least the identifier of the transmitting station and possibly also a list LST of pairs in which each pair associates a frequency and the identifier of a ground station suitable for communicating on that frequency.

In the example of FIG. 1, the communications device CMU0 is thus regularly informed by the ground station VGS1 on frequency FQ1 that another ground station VGS3 exists and that that other station communicates on the frequency FQ2. It is also assumed that there exists a ground station VGS2 operating on the frequency FQ2.

However, so long as the communications device CMU0 is in communication with the ground station VGS1 on the frequency FQ1, it does not hear messages broadcast by the stations on the other frequencies.

FIG. 2 is in the form of a flow chart showing communication being set up, and being lost, and also attempts at reestablishing communication in the present state of the art.

The first step E10 in the flow chart shows communication being set up by the communications device CMU0 with the ground station VGS1 on the frequency FQ1.

Once communication is established, the communications device CMU0 acts in a step E70 to ensure that this communication is maintained.

References F5a to F5f in FIG. 1 show the behavior of the communications device CMU0 in compliance with the VDL mode 2 protocol on losing communication with the ground station VGS1.

In compliance with the protocol, the communications device CMU0 acts during the step E70 to perform six attempts prior to considering that communication has been disrupted, occupying a total duration of about 45 seconds.

When it is confirmed that communication has failed, the communications device deploys four strategies to attempt to reestablish communication during steps E40 (strategy 1), E50 (strategies 2 and 3), and E60 (strategy 4).

More precisely, during a step E40, the communications device attempts to set up communication with the ground stations heard on the current frequency FQ1.

In the event of failure, the communications device then attempts in a step E50 to set up communication on a frequency of the above-mentioned list LST, namely in this example the frequency FQ2. For this purpose, it configures (reference F6) the bidirectional communications module VDR so that it communicates on the frequency FQ2. Thereafter, the communications device attempts to set up communication with the ground station communicating on the frequency FQ2, namely in this example with the ground station VGS3 (reference F7).

If this attempt fails, i.e. after six repeated failures over a total duration of 45 seconds, the communications device attempts to set up communication (reference F8) with another ground station VGS2, previously heard on the same frequency FQ2 (reference F10).

If this attempt succeeds, the communications device CMU0 does indeed communicate with the ground station VGS2 on the frequency FQ2 as represented by the downlink and uplink messages referenced F11 and F9, and during the step E70, it ensures that this communication is maintained.

If during the step E50, all of the frequencies of the list LST have been tried without success, then the communications device CMU0 attempts during a step E60 to set up communication on a frequency that is predefined in the VDL mode 2 standard.

Finally, if this last attempt at setting up communication fails, the communications device CMU0 considers that communication in VDL mode 2 has been interrupted, and during a step E43 it switches over to another mode of communication, namely mode A in this example.

The present invention seeks to improve this communications method.

OBJECT AND SUMMARY OF THE INVENTION

More precisely, in a first aspect, the invention provides a frequency management method compatible with the frequency management mechanism defined by the VDL mode 2 standard, this method being performed by a communications device on board an airborne platform, the communications device being suitable for configuring at least one bidirectional communications module and at least one independent receiver module, one of the bidirectional modules being in communication with a first ground station on a first frequency, the communications device being suitable for communicating with said ground station in VDL mode 2.

The method comprises:
  a reception step of receiving on the first frequency a message including a list having at least one pair, each pair associating a frequency with the identifier of a ground station suitable for communicating on that frequency;

on receiving the message, an activation step of activating in reception at least one of the above-mentioned modules in order to scan (i.e. to listen) at least one second frequency of the list;

a reception step of receiving via one of the activated modules at least one message transmitted by at least one second ground station on a said second frequency, the message including information enabling the airborne platform to set up communication with the second ground station;

a detection step of detecting at least one criterion representative of a break in communication with the first ground station;

a selection step of selecting a target ground station from the ground stations heard on said at least one second frequency during the reception step; and a configuration step of configuring one of said bidirectional modules to communicate with the target ground station on the second frequency.

Correspondingly, the invention also provides a communications device on board an airborne platform compatible with the frequency management mechanism defined by the VDL mode 2 standard, the device being suitable for configuring at least one bidirectional communications module and at least one independent receiver module, one of said bidirectional modules being suitable for setting up communication with a first ground station on a first frequency, the communications device being suitable for communicating with the ground station in VDL mode 2.

The device comprises:

first receiving module for receiving a message including a list having at least one pair, each pair associating a frequency with the identifier of a ground station suitable for communicating on that frequency;

activation module for activating in reception at least one of the independent receiver or bidirectional modules in order to scan at least one second frequency of the list, which activation module is acting on reception of the above-mentioned message;

detector module for detecting at least one criterion representative of a break in communication with the first ground station;

second receiving module for receiving via one of said activated modules at least one message transmitted by at least one second ground station on a said second frequency, the message including information enabling said airborne platform to set up communication with the second ground station;

selection module for selecting a target ground station from the ground stations heard on the second frequency; and configuration module for configuring one of the bidirectional modules to communicate with the target ground station on the second frequency.

Thus, in general manner and whenever possible, the invention seeks to reduce the time required for setting up communication with a new ground station when a break in communication with the current ground station is detected.

The invention proposes scanning the second frequency even if communication with the current ground station is satisfactory. This characteristic enables the airborne platform to keep up to date its knowledge about ground stations in its environment.

In particular, when there does indeed exist at least one ground station suitable for communicating with the airborne platform on one of the frequencies of the above-mentioned list, the invention makes it possible to switch over directly to such a station on detecting a break in communication with the current ground station.

This makes it possible to avoid the failures to set up communication as described above with references F5a to F5f in FIG. 1, when ground stations do indeed exist that are suitable for communicating with the airborne platform, while nevertheless conserving behavior in compliance with the VDL mode 2 standard.

In particular, the invention also makes it possible to select the new target ground station from a set of stations that are actually available, i.e. to select a ground station with which it is possible to set up a connection. This has the effect of avoiding a search to connect with a first station and then switching over to a second station having more suitable communications criteria, such as signal quality or services on offer, and thus makes it possible to avoid occupying bandwidth with pointless communications setup messages.

In a particular implementation, the selection of the target ground station from among those heard on the second frequency is made as a function of at least one element selected from:

radio conditions between the airborne platform and the ground station;

special tariffs granted to the operator of the airborne platform;

services offered by the ground station; and an indication as to whether the station covers the destination airport.

The ability to select the most appropriate ground station makes it possible to avoid switching over between stations, thereby limiting bandwidth occupation of the frequency.

In a particular implementation, during the activation step, the receiver modules available for scanning the frequencies of the list are activated, the frequencies being selected in random manner.

Thus, if a plurality of stations are heard and are used after losing communication, they communicate on a frequency selected from the list in random manner.

Operation is thus in compliance with the VDL mode 2 standard.

In a particular implementation, the frequency management method of the invention includes an activation step of activating one of the modules in reception to scan at least one frequency of a set of predefined frequencies when the number of independent receiver modules is greater than the number of pairs in the list, this set including the so-called common signaling channel (CSC) as defined in the VDL mode 2 standard.

When a break in communication with the current ground station is detected, the invention thus makes it possible to switch over directly to one of the stations heard on the set of predefined frequencies when no station has been heard on the frequencies of the list.

This makes it possible to avoid the above-described failures to set up communication when there do indeed exist stations suitable for communicating with the airborne platform, while conserving behavior in compliance with the VDL mode 2 standard.

In a particular implementation, in order to communicate with said target ground station on said second frequency the airborne platform configures the bidirectional communications module that it was using for communicating with said first ground station on the first frequency.

This implementation is preferred when the independent receiver module activated for scanning the second frequency is normally used on a priority basis for some other purpose, e.g. for assisting an audio communications module between the pilot and the ground.

In a variant, in order to communicate with said target ground station on said second frequency, the airborne platform configures a bidirectional communications module other than that used for communicating with said first ground station on said first frequency.

When the attempt to set up communication on the second frequency fails, after communication on the first frequency has been lost, this particular implementation makes it possible to scan two frequencies simultaneously, and thus statistically to accelerate detection of a frequency and of an available ground station, in other words this implementation makes it possible to maximize the chances of setting up communication as quickly as possible.

The invention also provides an airborne platform including a communications device as specified above, at least one bidirectional communications module, and at least one independent receiver module.

The particular characteristics and advantages of the communications device and of the airborne platform in accordance with the invention are similar to those of the above-mentioned frequency management method.

In a particular implementation, the various steps of the frequency management method are determined by computer program instructions.

Consequently, the invention also provides a computer program on a data medium, the program being suitable for being performed in a communications device, in a partition of a multifunction avionics unit, or more generally in a computer, the program including instructions adapted to performing steps of a frequency management method as described above.

The program may use any programming language and be in the form of source code, object code, or code intermediate between source code and object code, such as in a partially complied form, or in any other desirable form.

The invention also provides a computer readable data medium including instructions of a computer program enabling steps of the above-mentioned frequency management method to be executed.

The data medium may be any entity or device capable of storing the program. For example, the medium may comprise storage means, such as a read only memory (ROM), e.g. a compact disk (CD) ROM, or a microelectronic circuit ROM, or indeed magnetic recording means, such as a floppy disk or a hard disk of a computer, or as is often the case in aviation, a device known as a "dataloader".

Alternatively, the data medium may be an integrated circuit in which the program is incorporated, the circuit being adapted to execute or to be used in the execution of the method in question.

BRIEF DESCRIPTION OF THE DRAWINGS

Other characteristics and advantages of the present invention appear from the following description made with reference to the accompanying drawings which show an implementation having no limiting character. In the figures.

DETAILED DESCRIPTION OF AN IMPLEMENTATION

Figure 3:
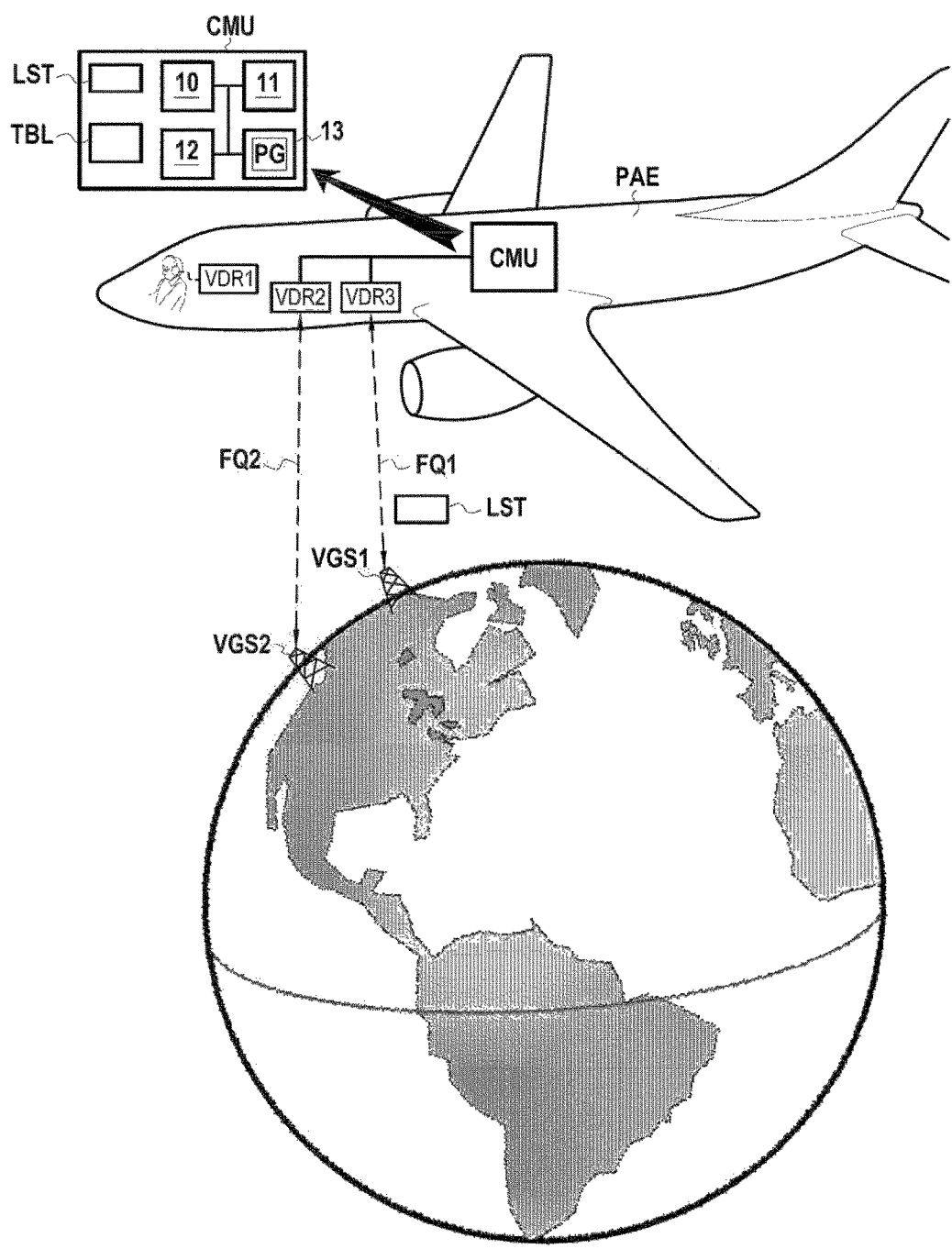
FIG. 3 shows an airborne platform in accordance with a particular embodiment of the invention.

FIG. 3 shows an airborne platform PAE in accordance with a particular embodiment of the invention. It differs from those of the prior art by the method performed by the onboard communications device CMU.

FIG. 3 also shows two ground stations VGS1 and VGS2, each being suitable for communicating on a given frequency, respectively FQ1 and FQ2, and in particular for regularly broadcasting messages GSIF containing their identifiers in a broadcast mode.

In this example, the airborne platform PAE includes in addition to the above-mentioned communications device CMU, two mutually independent bidirectional communications modules VDR2 and VDR3. The communications device CMU may be hosted in a dedicated unit or in a unit that includes the bidirectional communications modules VDR. It may also be hosted in a partition of a multifunction avionics unit. The modules may be incorporated in independent units or in logic modules hosted in a common unit.

In accordance with the invention, the communications device CMU is suitable for configuring each of these bidirectional communications modules independently of each other in order to scan respective given frequencies, e.g. FQ1 and FQ2, for messages transmitted by ground stations.

In accordance with the VDL mode 2 standard, the communications device CMU maintains a station table TBL including at least the identifiers of stations from which it has received a message MSGID within a period of time that is shorter than a predetermined duration.

In a particular implementation of the invention, the communications device CMU maintains a table TBL for each frequency scanned by the communications modules. This process is activated as soon as a receiver module is activated on a frequency.

In the presently-described implementation, this process of maintaining station tables TBL is split into two processes, namely:

a "FILL TBL" process of filling station tables TBL, this process being activated (or deactivated) together with activating (or deactivating) each independent receiver module and each bidirectional communications module; and a "PURGE TBL" process of cleaning up the station tables TBL by eliminating obsolete entries in compliance with the VDL mode 2 standard, this process being activated as soon as the communications device CMU activates a VDL mode 2 communication.

These two processes, which make up the station table maintaining process in this particular implementation are illustrated in the form of flow charts in FIGS. 10 and 11 and are described below.

Figures 2, 4A, 4B:
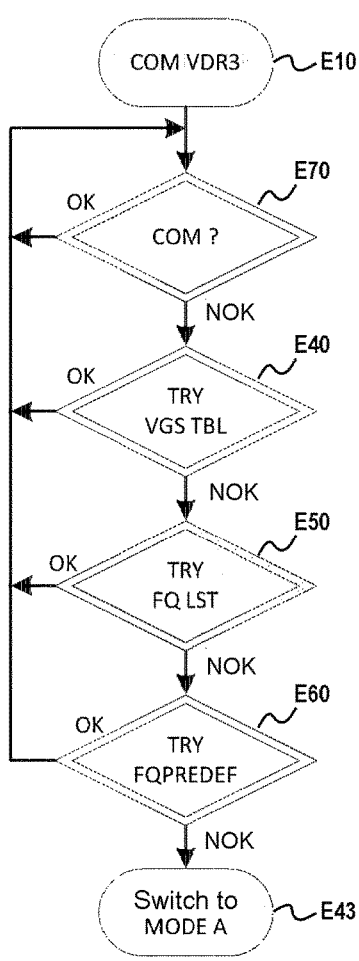
FIG. 4A shows station tables that can be used in a particular implementation of the invention.
FIG. 4B shows an example of a list of pairs.

An example of station tables TBL is shown in FIG. 4A. These tables specify the frequency with which each of them is associated (FQ2 and FQ3) and they contain the identifiers of ground stations heard on that frequency. In this particular example, they also contain:

signal quality parameters SQP;
available service parameters SVC; and
airport coverage information.

The first table associated with the frequency FQ2 includes the identifiers of ground stations VGS2 and VGS3 associated with respective signal qualities of 4 and 6, with services AOA and ATN, and with airports LFBO and LFDG, respectively. The second table associated with the frequency FQ3 includes the identifier of ground station VGS4 with a signal quality of 3, and only the service ATN, but no information about airport coverage.

When a ground station has been identified by the communications device CMU, the communications device CMU is suitable for communicating with that ground station via the bidirectional communications module configured on the frequency of the ground station, in compliance with the VDL mode 2 data communication protocol.

In compliance with the VDL mode 2 standard, when the communications device CMU is connected with a ground station, it can receive a list LST of pairs, this list being managed in this example in the manner that is described below with reference to FIG. 5. It should be recalled that each pair of the list LST associates a frequency with the identifier of a ground station suitable for communicating on that frequency. In the presently-described implementation, the communications device CMU activates this process as soon as it is connected with a ground station.

An example of such a list LST is shown in FIG. 4B. This list comprises the identifier of a ground station VGS3 suitable for communicating on the frequency FQ2, the identifier of a ground station VGS4 suitable for communicating on the frequency FQ3, and the identifier of a ground station $VGS_i$ suitable for communicating on a frequency $FQ_i$.

FIG. 3 also shows a voice type communications module VDR1 enabling the pilot of the airborne platform PAE to set up voice communication with the ground.

The communications device CMU presents the hardware architecture of a computer. In particular, it comprises a processor 10, a random access memory (RAM) 11, a rewritable non-volatile memory 12, e.g. a hard disk or an electrically erasable programmable read only memory (EEPROM), and a ROM 13. When the communications device CMU is hosted in a partition, the multifunction avionics unit that hosts this partition acts in conventional manner to make available some of its resources and in particular some of its capacity in terms of processor(s), RAM, non-volatile memory, ROM, and communications means in order to provide an environment that is completely identical with a hardware architecture so as to be indistinguishable for the communications device CMU.

The ROM 13 constitutes a data medium in accordance with the invention that is readable by the communications device CMU and that stores a computer program in accordance with the invention including instructions for executing steps of a frequency management method of the invention, with the main steps of that method being shown in FIGS. 5 to 12.

When the communications device CMU is hosted in a partition, the memory 13 is made available by the multifunction avionics unit that hosts the partition. The content of the memory is updated by methods that are conventional in the avionics world, e.g. and in non-limiting manner, by media such as floppy disks, universal serial bus (USB) keys, or by links of the type known as RS232, A615, AFDX, and/or Ethernet, from platforms of the laptop computer type or of the dataloader type.

It is assumed that during a step E10, the communications device CMU configures the bidirectional communications module VDR3 firstly to scan the frequency FQ1 and secondly to set up communication with the ground station VGS1 by using the VDL mode 2 protocol.

Figure 1:
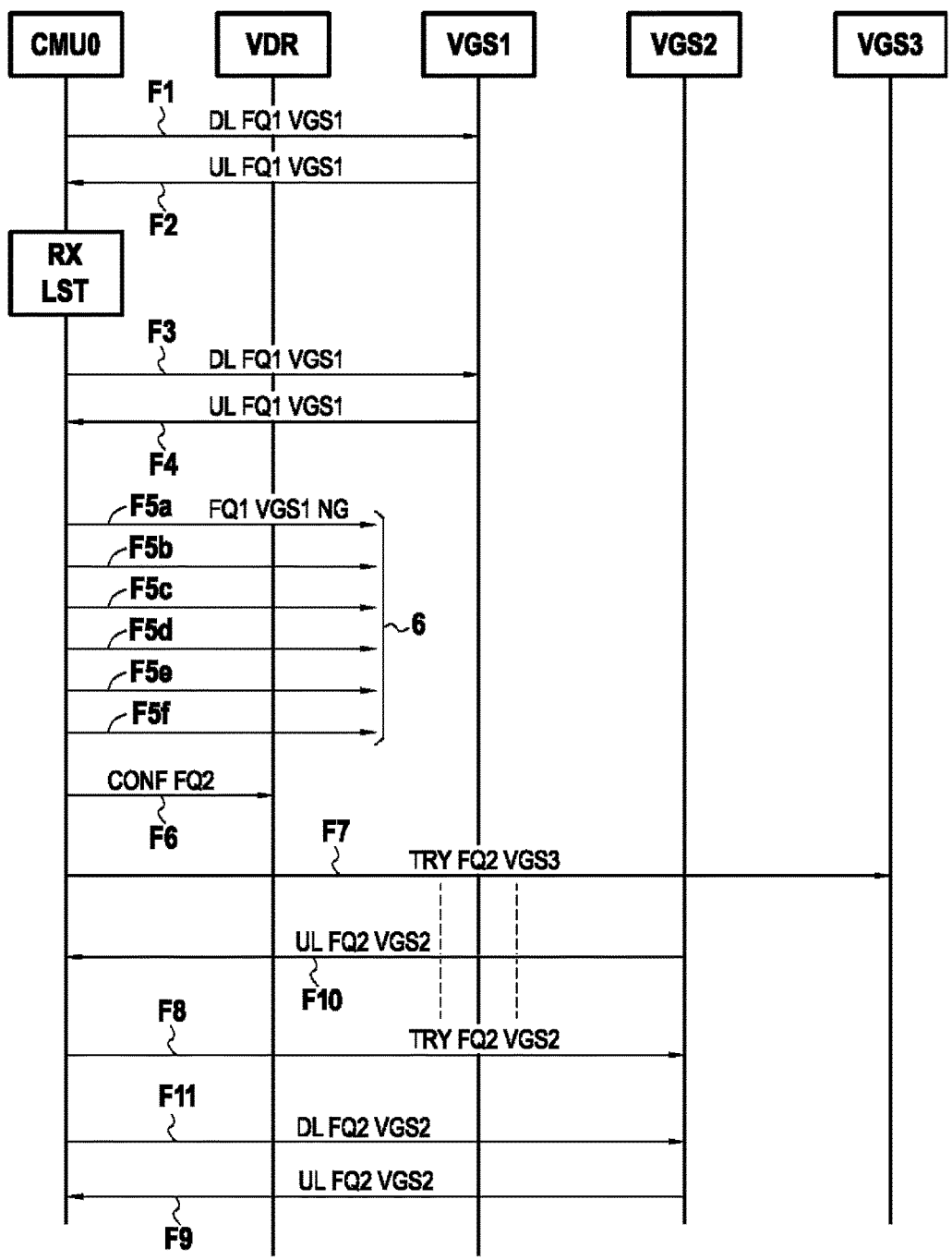
FIGS. 1 and 2 show a communications method in accordance with the prior art.

The communications device can thus send downlink messages to the ground station VGS1 and receive uplink messages from that station in compliance with this protocol, e.g. for air traffic control. These messages are similar to or of the same type as those referenced F1 and F2 in above-described FIG. 1.

Figure 5:
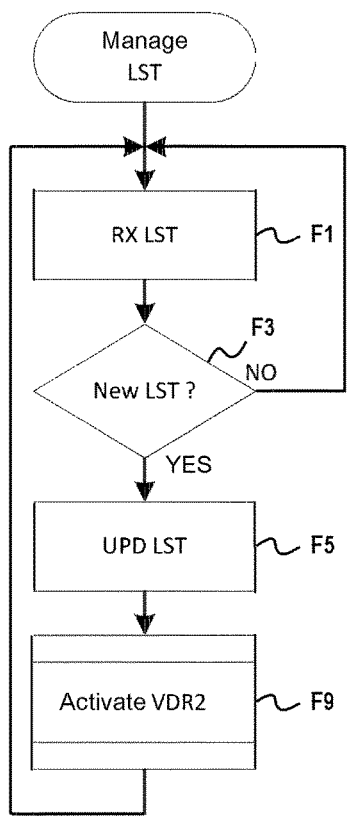
FIG. 5 is a flow chart showing a method of managing a list of pairs and suitable for use in a particular implementation of the invention.

As mentioned above, on setting up a connection with a ground station, the communications device CMU launches a process for managing a list of pairs, which process has main steps F1 to F9 that are shown in the form of a flow chart in FIG. 5.

This pair list management process has a first step F1 during which the communications device CMU receives via the bidirectional communications module VDR3 a message GSIF broadcasted by the station VGS1, this message including in known manner not only the identifier of the transmitter station VGS1, but also a list LST of pairs, each pair associating a frequency with the identifier of a ground station suitable for communicating on that frequency.

In parallel with communication with the ground station VGS1, as soon as the message has been received in step F1, and as described below with reference to FIGS. 9A and 9B, the communications device CMU activates at least one receiver module independent of VDR3 for scanning one of the frequencies of the list LST.

In the presently-described implementation, this activation process is performed only if the list received in step F1 is different from the last list LST previously received by the communications device CMU.

Consequently, during a step F3, the communications device CMU verifies whether the list LST received in step F1 differs from the last previously received list LST; if not, then step F3 is followed by step F1 during which the communications device CMU waits for the next message including a list LST of pairs that is to be received by the bidirectional communications module VDR3.

If the list LST received in step F3 is different from the last previously received list, prior to activating a receiver module independent of VDR3, the communications device CMU updates (step F5) its list of pairs, and then launches (step F9) execution of the process for activating a bidirectional module that is independent of VDR3, having main steps G2 to G19 that are described below with reference to FIGS. 9A and 9B.

During a first step G2 of this activation process, the communications device CMU stops the previous activation process and in particular stops all of the steps of waiting for resources such as the steps G11, G9, G7, and G17 that are described below, it deactivates all of the currently-activated receiver modules independent of VDR3, and it deletes all of the station tables TBL, with the exception of that used by VDR3. Thereafter, during a step G11, it verifies whether there remains at least one frequency of the list LST that is not being scanned, and where appropriate it randomly selects one of those frequencies FQi.

If such a frequency FQi exists, the communications device CMU searches (in a step G9) for an available receiver module and it allocates (in a step G13) that module to scanning said frequency FQi, as described with reference to FIG. 9B. If there is no available module, the communications device CMU waits for a receiver module to be released (loop G9 in FIG. 9A).

It should be observed that on receiving a message including a list LST, the communications device CMU releases (in step G2) all of the receiver modules VDR2 and ceases scanning frequencies. This mechanism guarantees that the tests of steps G11 and G9 will succeed and consequently that the activation step G13 will be launched for activating in reception at least one of said modules VDR2 in order to scan at least one frequency FQ2 of the list LST.

If the list LST has a plurality of pairs and the airborne platform PAE has a plurality of independent receiver modules VDR2, then the loop of steps G11, G9, and G13 is repeated.

If during step G11 the communications device CMU does not find any frequency of the list LST that is not already being scanned, it reiterates the test until there is a frequency of the list that is no longer being scanned.

In a particular implementation, if in step G11 the communications device CMU does not find any frequency in the list that is being scanned, it then verifies during a step G3 whether there exists in a predefined set of frequencies FQPREDEF at least one frequency FQPREDEFi that is not presently being scanned. This set of predefined frequencies is constituted by the special-use frequencies such as the common frequency known as the common signaling channel (CSC) as defined in the VDL mode 2 standard.

If so, the communications device CMU searches (in a step G4) for an available receiver module independent of VDR3, and it activates (in a step G5) this module to scan the predefined frequency FQPREDEFi selected in step G3. This receiver module VDR2 then scans this predefined frequency FQPREDEFi (loop G7) continuously, this scanning stage being interrupted only by deactivation of all of the independent receiver modules as performed in step G2, or by stopping the communications device CMU for VDL mode 2 communication, as occurs in step E43.

In this implementation, if during step G3 the communications device CMU does not find any predefined frequency FQPREDEFi that is being scanned, or if during step G4 it does not find any available receiver module independent of VDR3, then the communications device CMU returns to above-described verification step G11.

With reference to FIG. 9B, there follows a description of steps G15 to G19 which show activation of a module VDR2 in reception to scan at least one second frequency FQi of the list LST as takes place in above-described step G13.

During the first step G15 of this activation process, the communications device CMU activates the receiver module independent of VDR3 that was identified in step G9 to scan the frequency selected in step G11. In the presently-described implementation, this triggers activation of the "FILL TBL" process for filling a station table TBL, which process is shown in FIG. 10 and described below.

The communications device CMU acts in a step G16 to start a counter making it possible to perform a "scan cycle" as described in the VDL mode 2 standard, and then (in a step G17) it verifies whether an entry is present in the station table TBL. If so, the communications device CMU reiterates this step G17 so long as at least one station is present in the table. This enables the communications device CMU to have at least one frequency for which it has at least one identifier of a ground station suitable for communicating on that frequency. This information makes it possible in advantageous manner to set up communication in VDL mode 2 with a ground station within range of the airborne platform PAE.

If the communications device CMU finds an empty station table TBL in step G17, it acts during a step G18 to verify whether the counter started in step G16 has expired. If the counter has not yet expired, step G18 is followed by above-described step G17.

If the counter has expired (step G18), and if no station is listed in the station table (step G17), then step G18 is followed by a step G19 during which the communications device CMU releases the receiver module independent of VDR3. This has the following consequences:
- making this receiver module available once more for the activation process shown in FIG. 9A; and
- stopping the process of filling station tables TBL, which process was launched by activating the receiver module independent of VDR3 in step G15.

Figure 10:
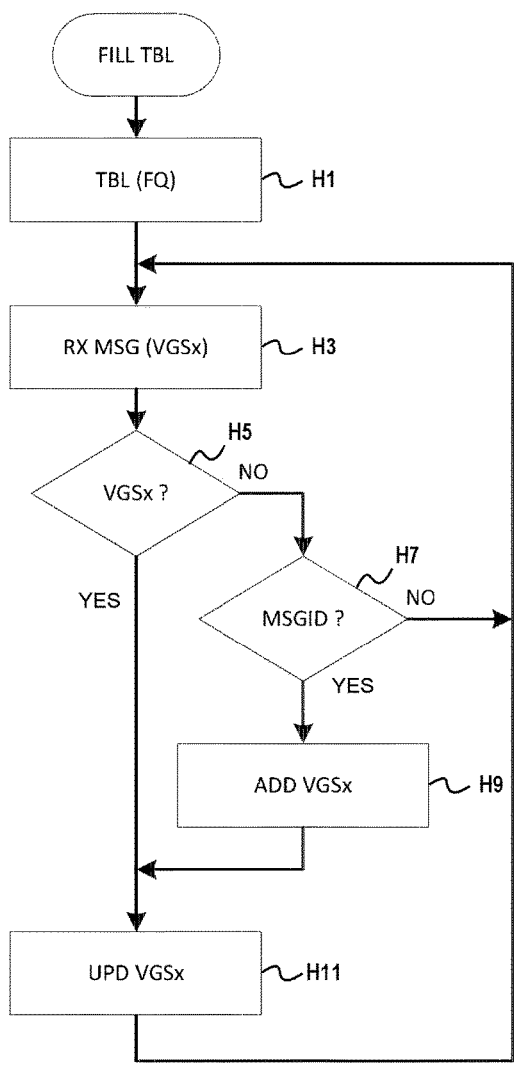
FIGS. 10 and 11 are flow charts showing a process for maintaining station tables in accordance with a particular implementation of the invention.

With reference to FIG. 10, there follows a description of the main steps H1 to H11 of the "FILL TBL" process for filling station tables TBL. This process, together with the "PURGE TBL" process for cleaning up the station tables as shown in FIG. 11, constitutes a process for maintaining station tables TBL in this implementation.

In known manner, these processes or equivalent processes are executed by the communications devices in compliance with the VDL mode 2 standard in order to maintain the list of stations heard on the frequencies to which the communications devices are already connected with a ground station or are attempting to make a connection with a ground station.

It should be recalled that in this implementation, the communications device CMU executes a station table maintenance process as soon as a receiver module VDR2, VDR3 is scanning a frequency FQi.

The first step H1 of the process performed for scanning a frequency FQ with a receiver module VDR is to create an empty station table associated with the frequency FQ (table TBL).

When the communications device CMU receives (in a step H3) via a communications module VDR, a message transmitted by a ground station VGSx on the frequency FQ, it verifies (in a step H5) whether the ground station is already present in the table of this module. If not, and if the received message is of the MSGID type, the communications device CMU stores the information in the message suitable for setting up communication with this ground station VGSx, and adds the identifier of the ground station VGSx to the station table TBL associated with the frequency FQ (steps H7 and H9). In the presently-described example, the communications device stores that the ground station VGSx is within range of the airborne platform PAE, is suitable for communicating on the frequency FQi, and possibly (as described above with reference to FIG. 4A), other information about this ground station, e.g.:

radio conditions between the airborne platform and the ground station;

special tariffs granted to the operator of the airborne platform;

services offered by the ground station; and/or an indication as to whether the station covers the destination airport.

If it is determined in step H5 that the ground station VGSx is already present in the table of the module VDR, or if it was added in step H9, then the communications device updates the information about this ground station VGSx in the table of the module VDR during a step H11.

Figure 11:
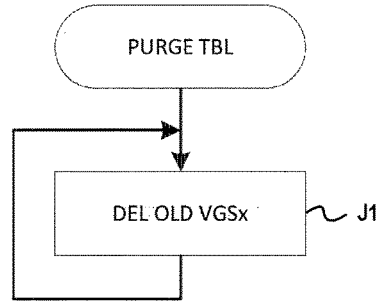

FIG. 11 shows a "PURGE TBL" process that is always active in this implementation, which process comprises a loop constituted by a single step J1 for deleting from the table TBL associated with a receiver module VDR the identifiers of the stations for which the module has not received the message MSGID within the above-mentioned predetermined duration.

The communications device continuously maintains a data structure that, at all times, contains information enabling it to set up communication in VDL mode 2 with one or more ground stations within range of the airborne platform PAE.

In the presently-described implementation, this data structure SD is stored in the rewritable non-volatile memory 12 of the communications device CMU.

In order to show up certain characteristics of the invention, we return to FIG. 2 which shows an implementation representative of the prior art, and we assume that the communications module VDR3 is communicating with a ground station on the frequency FQ1.

It should be observed that in compliance with the VDL mode 2 standard, the communications device CMU0 might need to change the ground station with which it is communicating for another ground station that can be heard on the same frequency. To do this, the communications device CMU0 attempts to set up a connection with the new station prior to terminating the previous connection; this enables the changeover to take place without losing communication.

During a step E70, the communications device CMU0 determines whether the communication with the current ground station is disrupted. So long as this is not so, the communications module VDR3 continues to communicate with the current ground station on the frequency FQ1 and to monitor the state of the communication.

In accordance with the VDL mode 2 standard, in the event of communication being lost, the communications device CMU0 puts into place four conventional strategies in the following order:

firstly, attempting (step E40) to set up communication with the ground stations heard on the current frequency FQ1;

secondly, attempting (step E50) to set up communication with each of the ground stations VGSi on frequency FQi, where the pairs (FQi, VGSi) are selected randomly from those in the list LST of pairs received in step F1;

thirdly, scanning (step E50) each of said frequencies, hoping to hear a ground station in order to connect therewith;

fourthly, scanning (step E60) the predefined common frequency FQPREDEF of the VDL mode 2 standard, hoping to hear a ground station in order to connect therewith; and finally considering that VDL mode 2 mode communication is disrupted and switching over to mode A in compliance with the VDL mode 2 standard.

Figure 8:
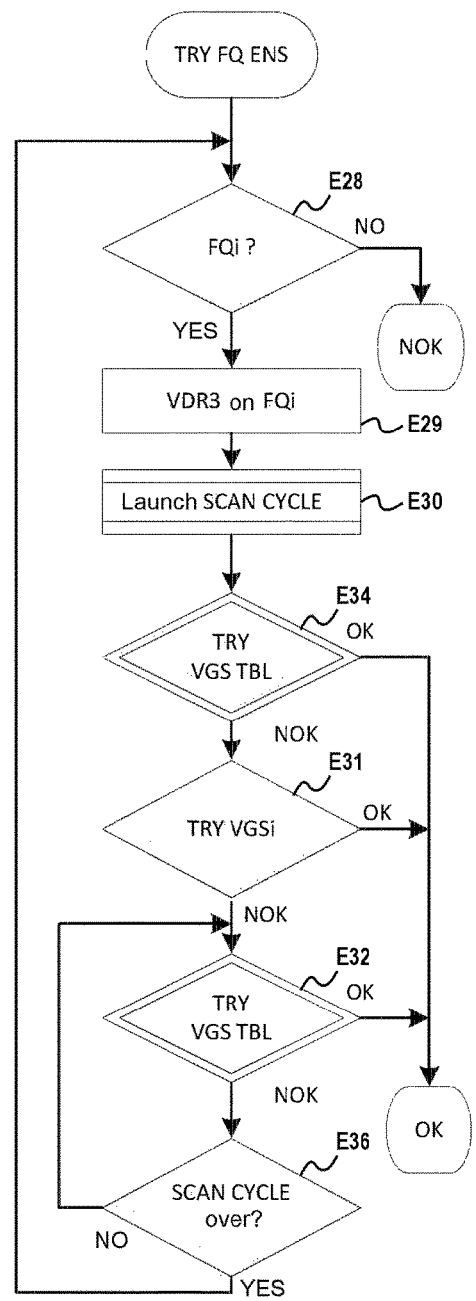
FIG. 8 shows a process enabling a communications device in accordance with a particular embodiment of the invention to connect on a frequency taken from a set of frequencies.
Figure 9:
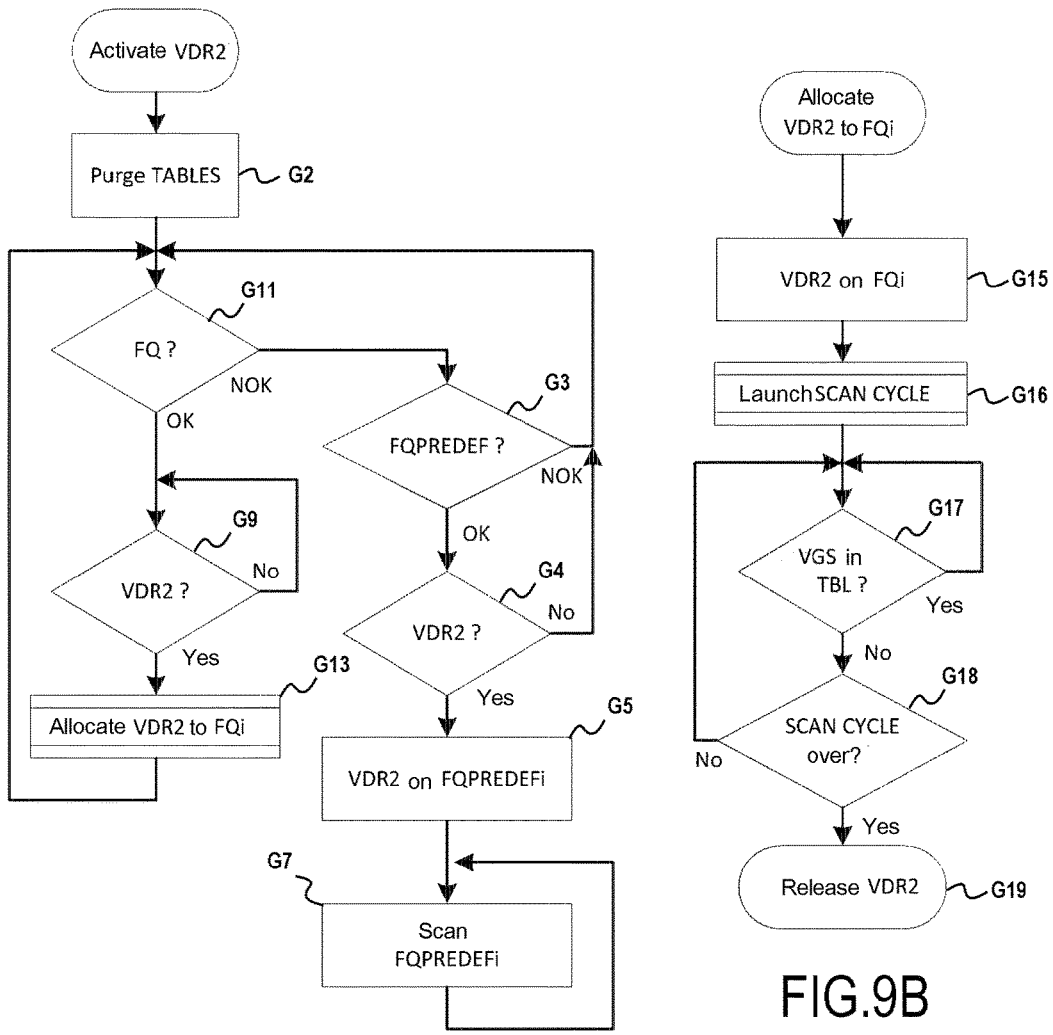
FIGS. 9A and 9B are flow charts showing the main steps performed by a receiver module for scanning a given frequency, in a particular implementation of the invention.

It should be observed that the conventional scanning strategies 2 and 3 operate in concert and that a particular implementation is described below with reference to FIG. 8.

Figure 6:
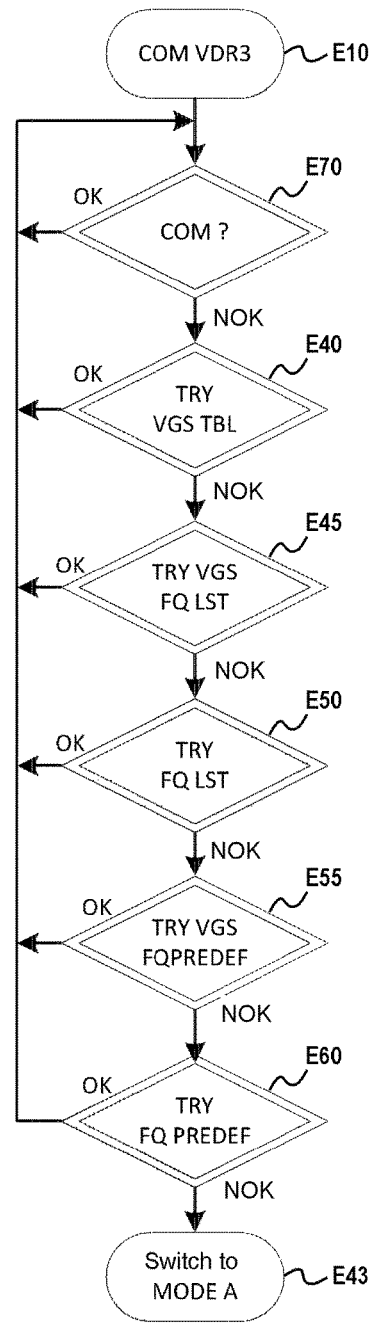
FIG. 6 is a flow chart showing the main steps of a method of managing frequencies in accordance with a particular implementation of the invention.

In the presently-described implementation, and with reference to FIG. 6, the communications device CMU implements the four above-described conventional strategies together with the following two additional strategies that are specific to the invention;

the first additional strategy specific to the invention consists in attempting (step E45) to establish communication with the ground stations heard on the frequencies of the list LST received in step F1; and the second additional strategy specific to the invention consists in attempting (step E55) to set up communication with the ground stations heard on the predefined frequencies FQPREDEF that have not been scanned in the preceding strategy.

Figure 12:
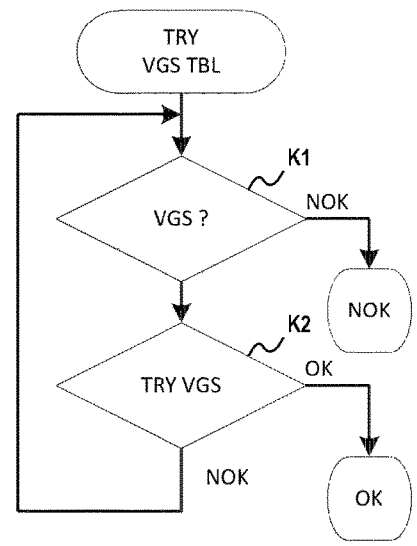
FIG. 12 is a flow chart showing the main steps of a first strategy that can be performed by a communications device in accordance with the invention in order to reestablish communication.

There follows a description of the first conventional strategy implemented during a step E40 by the communications device CMU. The details of this step are shown in FIG. 12. When the communications device CMU has determined (in step E70) that communication with the current ground station is disrupted on frequency FQ1, it acts during a step K1 to determine whether there exists at least one ground station VGS in the station table TBL associated with the current frequency FQ1 and to select one of those stations. In this implementation, if a plurality of stations is present in said table, it selects the best station in application of a heuristic configured in the communications device CMU. An example of such a heuristic consists in:

selecting the set of stations having a signal quality parameter SQP greater than 6, or by default the station(s) having the highest signal quality parameter SQP;

if the airborne platform PAE is descending, selecting from the previous selection, the set of stations having an airport coverage parameter corresponding to the code of the destination airport, and by default conserving the preceding preselection;

selecting from the preceding selection, those stations that offer the service (SVC) ATN, and by default conserving the preceding preselection; and finally, selecting the station(s) having the signal quality parameter SQP that is the highest, and in the event of a tie, selecting randomly between the stations.

Another heuristic that is simpler to implement consists in selecting the first station in the table TBL. When the communications device CMU is already connected to a station, the best station on the frequency is selected as in the prior art.

If the communications device CMU does indeed select a station in step K1, then during a step K2 it attempts to connect with that station. If the connection fails, it tries all of the other stations in succession, repeating steps K1 and K2.

If the test in step K1 fails (either because there is no station or because all attempts at making a connection in step K2 fail), then the communications device CMU attempts the first additional strategy specific to the invention.

Figure 7:
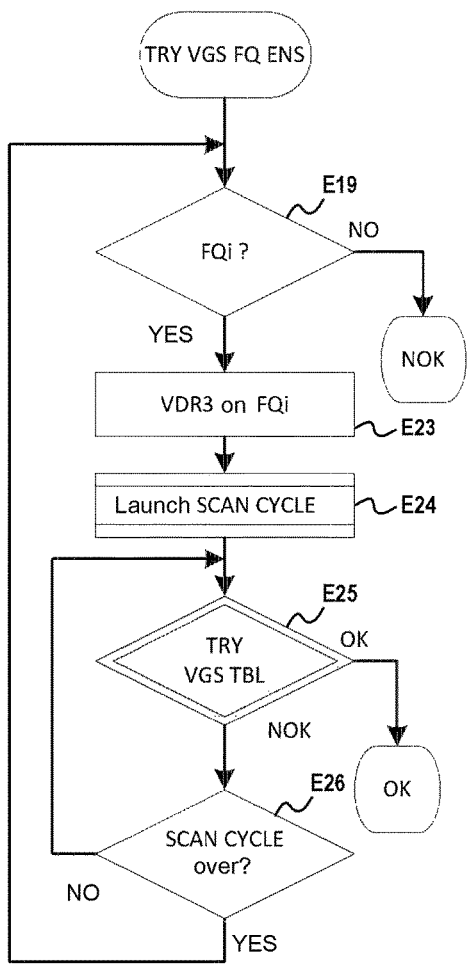
FIG. 7 is a flow chart showing the main steps of a first additional strategy that can be performed by a communications device in accordance with the invention in order to reestablish communication.

In this strategy, which is deployed during step E45, the communications device CMU attempts to make a connection on a set ENS of frequencies constituted by the frequencies of the most recent list LST on which it has received a message MSGID from at least one ground station VGSx within a duration shorter than the predetermined duration defined by the VDL mode 2 standard, which message MSGID contains information making it possible to set up communication with that ground station. The details of this step are shown in FIG. 7.

During a first step E19, the communications device CMU determines whether the above-mentioned set ENS includes a frequency FQi that is available and that it is not already scanning. Where appropriate, the communications device CMU selects one of these frequencies FQi randomly and configures the receiver module VDR3 to scan that frequency FQi (step E23), starting (step E24) a counter making it possible to perform a "scan cycle" as described above and attempting during a step E25 to set up communication via the receiver module VDR3 with a target ground station from among those heard on the frequency FQi. If this attempt at setting up communication fails, the communications device CMU reiterates this last step for each of the stations in the station table for the current frequency. In this implementation, this attempt takes place as described above for steps K1 and K2.

When the communications device CMU does not manage to connect with a station in step E25, then it acts during a step E26 to verify whether the counter started in step E24 has expired. If the counter has not yet expired, step E26 is followed by above-described step E25.

If the counter has expired (E26), and no connection has succeeded, then step E26 is followed by above-described step E19 during which the communications device CMU reiterates the same process with the other frequencies of the set ENS to which it has not already scanned.

When all of the frequencies in the set ENS have been tested, the test of step E19 fails, thereby indicating the end of the current strategy.

In the second and third conventional strategies deployed during step E50, the communications device CMU attempts to connect on a set ENS of frequencies taken from the frequencies of the most recent list LST other than those already scanned in the preceding strategy. The details of this step are shown in one implementation in FIG. 8.

During a first step E28, the communications device CMU determines whether the above-mentioned set ENS contains a frequency FQi that is available and that it has not already scanned. Where appropriate, the communications device CMU selects one of these frequencies randomly, configures the receiver module VDR3 to scan this frequency FQi (step E29), and triggers (step E30) a counter for performing a "scan cycle" as described above, and in this particular implementation then acts during a step E34 to attempt to set up communication via the receiver module VDR3 with a target ground station from among the stations heard on this frequency FQi. If this attempt of setting up communication fails, the communications device CMU attempts (E31) to set up communication via the receiver module VDR3 with the ground station VGSi, if such a station exists, in other words if the ground station VGSi is associated with the frequency FQi in the pair (FQi, VGSi) of the list LST of pairs received in step F1. This station always exists if the tested step ENS is a subset of the list LST of pairs. Thereafter, the communications device CMU acts in a step E32 to attempt to set up communication via the receiver module VDR3 with a target ground station from among those heard on this frequency FQi. If this attempt at setting up communication fails, the communications device CMU reiterates this last step with each of the stations in the station table for the current frequency. In this implementation, this attempt takes place as described above for the steps K1 and K2.

When the communications device CMU does not manage to connect with a station in step E32, it acts during a step E36 to verify whether the counter started in step E30 had expired. If this counter has not yet expired, the step E36 is followed by above-described step E32.

If the counter has expired (E36) and if no connection has succeeded, then step E36 is followed by above-described step E28 in which the communications device CMU reiterates the same process with the other frequencies of the set ENS that it has not yet scanned.

When all of the frequencies of the set ENS have been tested, then the test of step E28 fails, thereby marking the end of the current strategy.

In the non-conventional strategy specific to the invention and deployed during step E55, the communications device CMU attempts to connect with a set ENS of frequencies constituted by the predefined frequencies FQPREDEF on which it has received a message MSGID from at least one ground station VGSx within a duration shorter than the above-mentioned predetermined duration, which message MSGID contains information enabling communication to be set up with that ground station. In this strategy, the same steps E19 to E26 as described above with reference to FIG. 7 are performed. Only the content of the above-mentioned set ENS is changed in the manner described above. This strategy terminates when all of the frequencies in the set ENS have been tested.

In the fourth conventional strategy that is deployed during the step E60, the communications device CMU attempts to connect on a set ENS of frequencies constituted by predefined frequencies FQPREDEF other than those that it has already scanned during the preceding strategy. During this strategy, the same steps E28 to E36 as described above with reference to FIG. 8 are performed. Only the content of the above-mentioned set ENS is modified as specified above.

This strategy terminates when all of the frequencies of the set ENS have been tested. The communications device then considers that VDL mode 2 mode is interrupted, and during a step E43 it switches over to another communication mode, namely mode A in this example.

In the presently-described implementation, the target ground station selected in step E25 is selected as a function of at least one element selected from the following:
radio conditions between the airborne platform and the ground station;
special tariffs granted to the operator of the airborne platform;
services offered by the ground station; and
an indication as to whether the station covers the destination airport.

In the presently-described implementation, in order to communicate with this new target ground station on the second frequency, the airborne platform makes use of the bidirectional communications module VDR3 that it was using for communicating with the preceding ground station on the first frequency.

In a variant, in the presently-described implementation, it is possible to use the bidirectional communications module VDR2 for this purpose, with the communications module VDR3 then being available for scanning other frequencies, in compliance with steps G9 to G13.

What is claimed is:
1. A frequency management method compatible with a frequency management mechanism defined by a very high frequency digital link (VDL) mode 2 standard, the method being performed by a communications device on board an airborne platform suitable for configuring at least one bidi- rectional communications module and at least one independent receiver module, said at least one bidirectional communications module being in communication with a first ground station on a first frequency, said communications device being configured to communicate with said first ground station using the VDL mode 2 standard, wherein said first frequency is a first VDL mode 2 frequency, said method comprising:
  receiving, by said at least one bidirectional communications module in communication with said first ground station on said first frequency, a message including a list having at least one pair, said at least one pair associating a VDL mode 2 frequency with an identifier of a ground station suitable for communicating, using the VDL mode 2 standard, on an associated VDL mode 2 frequency;
  upon receiving said message,
    activating said at least one independent receiver module in order to scan at least one second frequency of the list, wherein said at least one second frequency is a second VDL mode 2 frequency, wherein said at least one independent receiver module scans, independent of said at least one bidirectional communications module in communication with said first ground station on said first frequency, said at least one second frequency of said list in parallel with said communication with said first ground station using the VDL mode 2 standard;
    receiving via said at least one independent receiver module at least one message transmitted by at least one second ground station on said at least one second frequency, said at least one message including information enabling said airborne platform to set up communication with said at least one second ground station; and
    storing said information included in said at least one message in a station table, said at least one second ground station associated with said at least one second frequency in said station table;
  detecting at least one criterion representative of a break in communication with said first ground station;
  responsive to said detecting,
    selecting from said station table a target ground station from said at least one second ground station associated with said at least one second frequency; and
    configuring one of said at least one bidirectional communications module to communicate with said target ground station on said at least one second frequency using the VDL mode 2 standard.

2. A frequency management method according to claim 1, wherein said selection of said target ground station from among said at least one second ground station associated with said at least one second frequency is made as a function of at least one element selected from:
  radio conditions between said airborne platform and said at least one second ground station;
  special tariffs granted to an operator of said airborne platform;
  services offered by said at least one second ground station; and
  an indication as to whether said at least one second ground station covers a destination airport.

3. A frequency management method according to claim 1, wherein activating said at least one independent receiver module comprises activating said at least one independent receiver module available for scanning frequencies of said list, and wherein said frequencies are selected in a random manner from said list.

4. A frequency management method according to claim 1, wherein in order to communicate with said target ground station on said at least one second frequency, said airborne platform configures said at least one bidirectional communications module the airborne platform was using for communicating with said first ground station on said first frequency.

5. A frequency management method according to claim 1, wherein in order to communicate with said target ground station on said at least one second frequency, said airborne platform configures a bidirectional communications module other than a particular bidirectional communications module of said at least one bidirectional communications module used for communicating with said first ground station on said first frequency.

6. A frequency management method according to claim 1, further comprising activating said at least one independent receiver module to scan at least one frequency of a set of predefined frequencies when a number of said at least one independent receiver module is greater than a number of pairs in said list, the set of predefined frequencies including a common signaling channel frequency defined in the VDL mode 2 standard.

7. A communications device on board an airborne platform and compatible with a frequency management mechanism defined by a very high frequency digital link (VDL) mode 2 standard, the communications device being suitable for configuring a plurality of bidirectional communications modules and at least one independent receiver module, a first of said plurality of bidirectional communications modules being configured to set up communication with a first ground station on a first frequency, said communications device being configured to communicate with said first ground station using the VDL mode 2 standard, wherein said first frequency is a first VDL mode 2 frequency, said communications device comprising:
  a first receiving module for receiving on said first frequency a message including a list having at least one pair, said at least one pair associating a VDL mode 2 frequency with an identifier of a ground station suitable for communicating, using the VDL mode 2 standard, on an associated VDL mode 2 frequency;
  an activation module for activating said at least one independent receiver module or a second bidirectional communications module of said plurality of bidirectional communications modules in order to scan at least one second frequency of the list, wherein said at least one second frequency is a second VDL mode 2 frequency, wherein the activation module acts upon receiving said message, wherein said at least one independent receiver module or said second bidirectional communications module of said plurality of bidirectional communications modules scans, independent of said first of said plurality of bidirectional communications modules configured to set up communication with the first ground station on the first frequency, said at least one second frequency of said list in parallel with said communication with said first ground station using the VDL mode 2 standard;
  a second receiving module for receiving via said at least one independent receiver module or said second bidirectional communications module of said plurality of bidirectional communications modules at least one message transmitted by at least one second ground station on said at least one second frequency upon receiving said message, said at least one message including information enabling said communications device to set up communication with said at least one second ground station upon receiving said message;

a storage module for storing said information included in said at least one message in a station table upon receiving said message, said at least one second ground station associated with said at least one second frequency in the station table;

a detector module for detecting at least one criterion representative of a break in communication with said first ground station;

a selection module for selecting from said station table a target ground station from said at least one second ground station associated with said at least one second frequency responsive to said detecting; and a configuration module for configuring one of said plurality of bidirectional communications modules to communicate with said target ground station on said at least one second frequency using the VDL mode 2 standard responsive to said detecting.

8. A communications device on board an airborne platform according to claim 7, wherein said communications device comprises said plurality of bidirectional communications modules and said at least one independent receiver module.

9. A communications device on board an airborne platform according to claim 7, wherein selecting from said station table said target ground station from said at least one second ground station associated with said at least one second frequency responsive to said detecting is made as a function of at least one element selected from:

radio conditions between said airborne platform and said at least one second ground station;

special tariffs granted to an operator of said airborne platform;

services offered by said at least one second ground station; and an indication as to whether said at least one second ground station covers a destination airport.

10. A communications device on board an airborne platform according to claim 7, wherein activating said at least independent receiver modules or said second bidirectional communications module of said plurality of bidirectional communications modules comprises activating said at least one independent receiver module or said second bidirectional communications module of said plurality of bidirectional communications modules available for scanning frequencies of said list, and wherein said frequencies are selected in a random manner from said list.

11. A communications device on board an airborne platform according to claim 7, wherein in order to communicate with said target ground station on said second frequency, said configuration module configures said first of said plurality of bidirectional communications modules the communications device was using for communicating with said first ground station on said first frequency.

12. A communications device on board an airborne platform according to claim 7, wherein in order to communicate with said target ground station on said second frequency, said configuration module configures said second bidirectional communications module of said plurality of bidirectional communications modules other than said first of said plurality of bidirectional communications modules used for communicating with said first ground station on said first frequency.

13. A communications device on board an airborne platform according to claim 7, wherein activating said at least one independent receiver module or said second bidirectional communications module of said plurality of bidirectional communications modules comprises activating said at least one independent receiver module or said second bidirectional communications module of said plurality of bidirectional communications modules to scan at least one frequency of a set of predefined frequencies when a number of said at least one independent receiver module or said plurality of bidirectional communications modules is greater than a number of pairs in said list, the set of predefined frequencies including a common signaling channel frequency defined in the VDL mode 2 standard.

14. A non-volatile computer-readable data medium having instructions stored therein, said instructions being executable by a processor to cause said processor to perform operations comprising:

receiving, by one of one or more bidirectional communications modules, on a first frequency a message from a first ground station including a list having at least one pair, said at least one pair associating a VDL mode 2 frequency with an identifier of a second ground station suitable for communicating, using said VDL mode 2 standard, on an associated VDL mode 2 frequency, wherein said first frequency is a first VDL mode 2 frequency;

upon receiving said message,
activating at least one receiver module in order to scan at least one second frequency of said list, wherein said at least one second frequency is a second VDL mode 2 frequency, wherein said at least one receiver module scans, independent of said one of said one or more bidirectional communications modules receiving on said first frequency said message from said first ground station, said at least one second frequency of said list in parallel with communication with said first ground station using a very high frequency digital link (VDL) mode 2 standard;

receiving via said at least one receiver module at least one message transmitted by at least one second ground station on said at least one second frequency, said at least one message including information enabling an airborne platform to set up communication with said at least one second ground station; and storing said information included in said at least one message in a station table, said at least one second ground station associated with said at least one second frequency in said station table;

detecting at least one criterion representative of a break in communication with said first ground station;

responsive to said detecting,
selecting from said station table a target ground station from said at least one second ground station associated with said at least one second frequency; and configuring a particular bidirectional communications module of said one or more bidirectional communications modules to communicate with said target ground station on said at least one second frequency using the VDL mode 2 standard.

15. A non-volatile computer-readable data medium according to claim 14, wherein activating said at least one receiver module comprises activating said at least one receiver module available for scanning frequencies of said list, and wherein said frequencies are selected in a random manner from said list.

16. A non-volatile computer-readable data medium according to claim 14, wherein in order to communicate with said target ground station on said at least one second frequency, said airborne platform configures said particular bidirectional communications module of said one or more bidirectional communications modules, wherein the airborne platform was using said particular bidirectional communications module of said one or more bidirectional communications modules for communicating with said first ground station on said first frequency.

17. A non-volatile computer-readable data medium according to claim 14, wherein in order to communicate with said target ground station on said at least one second frequency, said airborne platform configures said particular bidirectional communications module of said one or more bidirectional communications modules other than said one of said one or more bidirectional communications modules used for communicating with said first ground station on said first frequency.

18. A non-volatile computer-readable data medium according to claim 14, further comprising activating one of said at least one receiver module to scan at least one frequency of a set of predefined frequencies when a number of said at least one independent receiver module is greater than a number of pairs in said list, said set of predefined frequencies including a common signaling channel frequency defined in said VDL mode 2 standard.

19. A non-volatile computer-readable data medium according to claim 14, wherein selecting from said station table said target ground station is made as a function of at least one element selected from:
radio conditions between said airborne platform and said at least one second ground station; and
special tariffs granted to an operator of said airborne platform.

20. A non-volatile computer-readable data medium according to claim 19, wherein said at least one element is further selected further from:
services offered by said at least one second ground station; and
an indication as to whether said at least one second ground station covers a destination airport.

* * * * *